United States Patent [19]

Hanus et al.

[11] Patent Number: 4,974,635
[45] Date of Patent: Dec. 4, 1990

[54] COUPLER WITH SPRING-LOCKED VALVES

[75] Inventors: Jean-Nicolas Hanus, Douvaine; Bernard Anthoine, Annemasse, both of France

[73] Assignee: Parker Hannifin RAK S.A., Annemasse, France

[21] Appl. No.: 345,389

[22] Filed: May 1, 1989

[51] Int. Cl.$^5$ .............................................. F16L 29/00
[52] U.S. Cl. ................................................ 137/614.05
[58] Field of Search .......................... 137/614.05, 614

[56] References Cited

U.S. PATENT DOCUMENTS

| 3,477,468 | 11/1969 | Kopaska | 137/614.05 |
| 4,200,121 | 4/1980 | Walter et al. | 137/614.05 |
| 4,398,561 | 8/1983 | Maldavs | 137/614.05 |

FOREIGN PATENT DOCUMENTS

| 0096649 | 12/1983 | European Pat. Off. |
| 0184702 | 6/1986 | European Pat. Off. |
| 2854511 | 1/1981 | Fed. Rep. of Germany |
| 3015601 | 10/1981 | Fed. Rep. of Germany |
| 2384196 | 2/1978 | France |

Primary Examiner—John C. Fox
Attorney, Agent, or Firm—Christopher H. Morgan

[57] ABSTRACT

The retractable stop associated with the valve (14) of the female element (2) consists of a spring (26) in catch (hook) form (26), of which the branches (26a) are engaged on the stem (14a) of the valve (14), so as to grip it constantly between two zones, diametrically opposite each other, while the sliding ring (24) has, at its end turned toward the collar (20), a cylindrical segment (24b) of diameter (D3) greater than that of the first section (14'a) of the stem (14a) of the valve (14), and between its end (24a), designed to come in contact with the shoulder (23) of the stem (14a) and the said cylindrical segment (24b), a truncated cone segment (24c), of which the small diameter is equal to the diameter (D1) of the first section (14'a) of the stem (14a), and which is designed to be situated between the branches (26a) of the catch (26) when the ring (24) is supported against the shoulder (23) of the stem (14a) of the valve (14), and this latter is in normal opening position.

3 Claims, 2 Drawing Sheets

COUPLER WITH SPRING-LOCKED VALVES

BACKGROUND OF THE INVENTION

This invention relates to a coupler with flap valves, with mobile outer socket, with double action, that is, of the type which includes two elements, male and female, each having a flap valve, of which the male element is provided with means of connection to a circuit of use, and of which the female element, which is provided with means of connection to a feed circuit with fluid under pressure, bears an outer socket, movable axially in both directions, and having a biconical inner groove which, in the equilibrium position of the socket, that is, in a position of rest or of operation of the coupler, acts radially on an annular row of locking balls, to hold them into their most inner radial position, in which projecting to the inside of the bore of the female element, they can be engaged in an annular hollow (throat) of the male element when the latter is engaged in the bore of the female element, each valve being provided with a pullback spring into the closing position and a stop, limiting its opening course, (movement) to half the course of engagement of the male element in the female element.

FIELD OF THE INVENTION

One maneuver, in one direction or the other, of the outer socket, permits, by freeing the locking balls withdrawal of the male element from the female element or its engagement therein, and, in this engagement, the two valves are supported one against the other, and rise reciprocally from their seats, until reaching, at the end of the engagement, their total opening position, in which each of them rests against its end-of-course stop opening.

Normally, the fluid flows from the female to the male element and, as a safety measure, during a coupling, the feed circuit must be kept closed until the locking of the coupling, and, so that it will always be possible to carry out the coupling before opening the feed circuit, and despite the possibility, in the user circuit, that is, on the male side, of a residual pressure which could oppose the opening of the valve of the male element, in some couplers, the stop associated with the valve of the female element, that is, on the feed side, is arranged so that, on the one hand, it is automatically retracted, during the coupling, to permit it to make an opening movement equal to double its normal movement, and, on the other hand, it is automatically brought back into active position with the opening of the feed circuit after locking of the male element into the female element.

The return into active position of the retractable stop, with the opening of the feed circuit is indispensable, to permit a stable functioning of the coupler, because a reversal of direction of the circulation of the fluid would inevitably cause the closing of the valve of the male element and would oppose this reversal. Now, such a reversal is obligatory in many circuits, such as the control circuits of hydraulic jacks or of hydraulic motors with reversal of the direction of rotation.

DESCRIPTION OF THE PRIOR ART

Such a coupler is known, especially from French Patent No. 2,384,196, in which the stem of the valve of the female element, that is, situated on the feed side, has, on the side of its free end, and beyond a first section of which the length corresponds to its normal opening movement, a second section of smaller diameter limited, on the valve head side, by a shoulder, designed to form the support catch against the retractable stop, in the active position, and, on the other side, be a collar, on which is mounted a mobile ring, sliding axially between the shoulder and the collar, and of which the length is substantially equal to the normal course of opening of this valve, plus the length of the sliding ring, while the retractable stop consists of an element, constantly pushed radially toward the stem of the valve, by spring means, and which, in the closing position of the valve, rests against the ring, which rests against the collar. However, if there exists, during the coupling of the male and female elements of this coupling, any residual pressure in the feed circuit, the two valves mutually push each other into the normal opening position without the valve of the female element making a movement double its normal opening course, and in this case, the sliding ring rests on contact with the retractable stop, which, therefore, can not return to its active position. As a result, during the first reversal of the direction of fluid circulation, the valve of the female element, of which the stop has remained retracted, can pull back under the push of the valve of the male element, which can be closed and thus opposed to this reversal.

Therefore, this coupler can not be used in an installation with double direction of fluid circulation unless one is assured that there will always be a residual in the user circuit.

This invention is intended to remedy these difficulties. For this purpose, it concerns a couple of the type last mentioned, in which the retractable stop, associated with the valve of the female element, that is, on the feed side, consists of a spring in hook (catch) form, of which the branches are engaged over the stem of the valve, so as to grip it constantly between two diametrically opposed zones, while the sliding ring has, at its end toward the collar side, a cylindrical segment of diameter greater than that of the first section of the valve stem, and between its end designed to come in contact with the shoulder of the stem, and this cylindrical segment, a truncated cone segment of which the small diameter is equal to the diameter of the first section of the stem, and is designed to be situated between the branches of the catch when the sliding ring is supported against the collar of the valve and this latter is in its closing position.

Thanks to this arrangement, when the coupling of the two elements of the coupler is done without residual pressure from the user side, the two valves are opened mutually and simultaneously, so that the valve of the female element, that is, on the feed side, effects a movement at the end of which the shoulder of its stem comes in contact with the corresponding end of the sliding ring and pushes it until the truncated cone segment of this latter is situated between the branches of the catch, of which the gripping force has the effect of driving the ring int he direction of the collar of the valve stem and, as a result of their coming into contact with the second section of the valve stem, the placing in active position of the branches of the catch behind the shoulder of this stem.

According to one simple form of execution of the invention, the valve stem of the female element, that is, on the feed side, and its sliding ring, are mounted to slide axially in a sleeve fixed solid with the body (housing) of the coupler, and having at the place provided for the branches of the catch, two holes passing through, diametrically opposite, the rigid connection between the sleeve and the housing of the coupler being assured by a crown of radial fins between which the fluid under pressure can freely circulate.

At any rate, the invention will be better understood from the description which follows, with reference to the attached schematic drawing, showing, by way of example an not limitation, one form of execution of this coupler:

SUMMARY OF THE INVENTION

DESCRIPTION OF PREFERRED EMBODIMENTS

Figure 1:
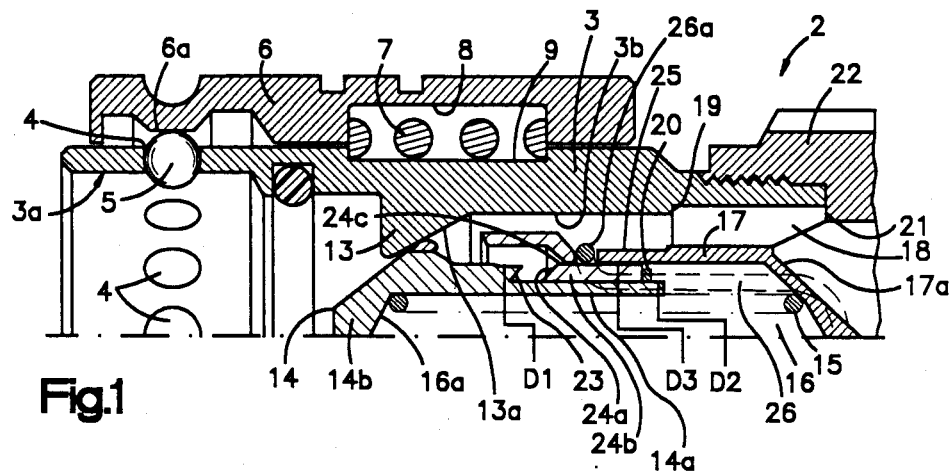
FIG. 1 is a view in axial half-section of the female element alone, that is the element on the feed side.

The coupler according to the invention is of the type with valves and with mobile outer socket, with double action. The female element of this coupler, as shown in FIG. 1, includes a tubular central body 3, designed to be fixed rigidly to a male or female connection of one element of a distribution circuit, such as a distributor or other similar (circuit), not shown in the drawing. This tubular body 3 has, on the side of its coupling end, that is, on the side of its end opposite that provided for its connection to the feed circuit, a bore 3a, forming the female end of this element, and designed to receive, lodge and retain the tine of the male element 12. To the right of this bore 3a, the tubular body 3 has an annular row of holes 4, passing through, each of which has an inner end of smaller diameter than its outer end, is designed to lodge, while retaining, a locking ball 5. The balls 5 are normally held in their innermost position radially, that is, supported against the inner end, serving them as seat, of the corresponding hole, by an inner groove 6a, provided for this purpose, in the bore of an outer mobile socket 6, and which is normally held in the position in which it surrounds the balls 5, by a spiral spring 7, acting simultaneously on the shoulders made for this purpose, on the ends of two annular chambers 8 and 9, made in the bore of the socket 6 and at the periphery of the tubular body 3.

An axial movement in one direction or the other of the outer mobile socket 6 permits displacing the groove 6a in relation to the row of balls 5, and freeing these latter from any radial constraint, which of course, allows their radial movement toward the outside.

The tubular element 3 has also, at the inner end of the bore, provided to receive the tip of the male element 12, an inner annular projection 13, of which the surface 13a, opposite the bore 3a, is inclined to serve as seat for the valve 14, associated with the female element 2, and which is normally held in the closing position by a spiral pull-back spring 15, supported, on the one hand, against the bottom 16a of a bore 16 made in the stem 14a of the valve 14, and coaxially with this stem, and on the other hand, against the bottom 17a of a cylindrical sleeve 17, designed to serve as guide for the stem 14a of the valve 14, and which is fixed, through radial fins, with which it is solid, to the tubular body 3 of the female element.

In the example shown in the drawing, this fixing is assured by engagement and gripping of the radially outward ends of the fins 11, between two shoulders 19 and 21, facing each other, of which one, 19, is made in a prolongation 3b beyond the seat 13a of the bore 3a of the tubular body 3, and of which the other, 21, is made in an assembling screw 22, screwed onto the corresponding end of the tubular body 3.

As the drawing shown, the stem 14a of the valve 14 has, starting from its head 14b, a first section 14'a, of an outer diameter D1, followed by an extension forming a second section 14"a, of a diameter D2 smaller than the diameter D1 of the first section 14'a, from which it is separated by a shoulder 23. On the section 14"a of the stem 14a farthest from the head 14b is mounted a ring 24, sliding axially, of which the outer diameter D3 is greater than the diameter D1 of the section 14'a of the stem 14a of the valve 14. This ring 24, of which the length is less than that of the section 14"a of the stem 14a of the valve 14, is held prisoner on the latter by a collar 20, provided at the rear end of the stem 14a of the valve 14, and consists of a circlips (ring clip). The ring 24 is thus mounted axially between the shoulder 23 and the collar 24.

For reasons which will be explained later, at one end, situated beside the shoulder 23, the ring 24 has a truncated cone section, converging in the direction of the head 14b of the valve 14, and the shoulder 23 has a complementing profile which permits it to fit (espouse) perfectly the truncated cone end 24a of the ring 24.

Finally, for reasons to be explained later, between its truncated cone segment 24a and its rear cylindrical segment 24b, of diameter D3, the ring 24 has a truncated cone segment 24c, assuring continuity of surface between its rear segment 24b and its truncated cone segment 24a.

Figure 4:
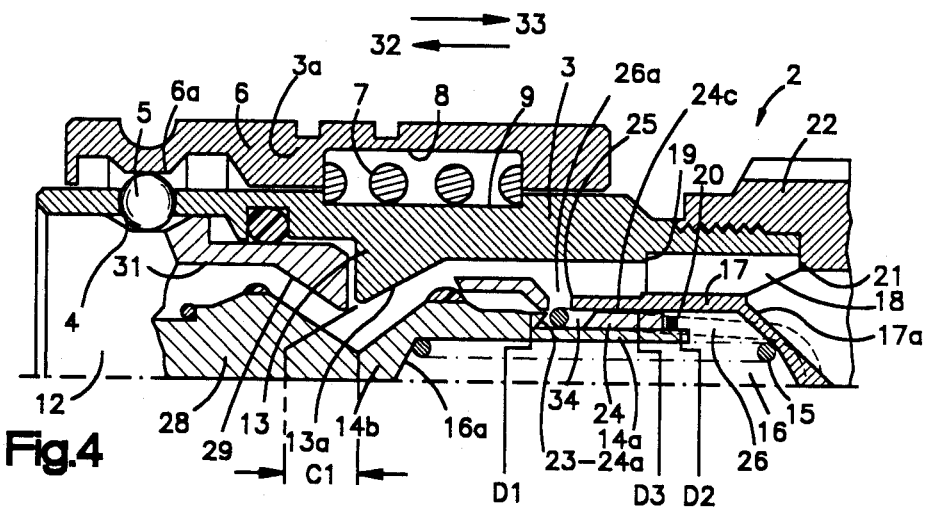
FIG. 4 is a view similar to FIG. 3, showing the coupler in use position, that is, after opening of the feed circuit.

The cylindrical sleeve 17, serving to lodge and guide the stem 14a of the valve 14 has two holes 25, passing through, diametrically opposite and directed perpendicular to its axis. These two holes 25 are designed to allow the passage of two side branches 26a of a spring 26 in catch (hook) form. These two side branches 26a are designed to form a retractable stop of the valve 14, limiting, normally, its opening movement to its normal value, and supported against the section 14"a, of smaller diameter D2 of the stem 14a of the valve 14 just behind the shoulder 23, as shown in FIG. 4.

In the example shown in the drawing, to save space and consequently facilitate the lodging of the catch 26, the ends of its side branches 26a, engaged on the stem 14a of the valve 14, are bent at right angles to the body of the catch 26, and can thus be applied against the cylindrical outer surface of the sleeve 17.

Figure 2:
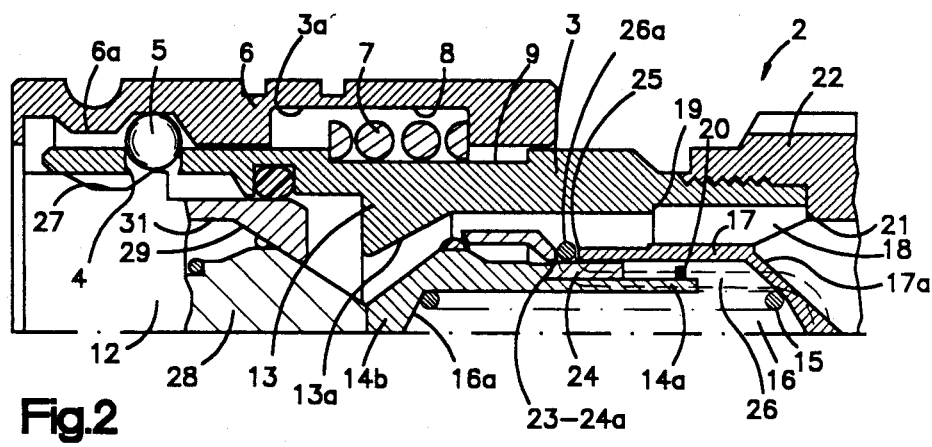
FIG. 2 is a view similar to FIG. 1, showing the male element, that is, the element on the side of the use circuit, partly engaged in the female element.

In the drawing is shown only the assembling tip of the male element 12 of this coupler. This male element includes, in a manner known per se, an annular hollow (throat) 27, designed to receive, after its engagement in the bore 3a of the female element 2, the locking balls 5, the engagement of the male tip 12 being made possible by the movement of the mobile socket 6, in ne direction or the other, until the effacement of its groove 6a, in relation to the annular row of balls 5, as shown in FIG. 2, includes also a valve 28, of which only the head is visible in the drawing, but which is normally applied, by a spring, not shown, resting tightly against its seat 29, made at the end of the bore 31 of the tip of this male element 12.

The purpose of the coupler of the invention is to permit the coupling of two elements female 2 and male 12, and the proper functioning of this coupling, whether or not a residual pressure exists on the use circuit side, that is, the side of the male element 12 of this coupling.

We can easily see that such a residual pressure, if it is great, may possibly oppose the lifting of the valve 28 from its seat 29. To permit the making of the coupling, despite such a residual pressure in the use circuit, there is provided in this coupler, and in a manner known per se, the possibility for the valve 14 for the female element 2, to make a movement double that necessary for its normal opening. The movement necessary for its normal opening corresponds to that made between the positions it occupies in FIGS. 1 and 4, and which is shown in FIG. 4, designated only as C1.

Normally, the fluid under pressure circulates in the direction shown by the arrow 32, that is, flowing from the female element 2 toward the male element 12. However, in some modes of use and, especially if this coupler is connected to a distributor, the direction of fluid circulation may be reversed and established in the direction shown by the arrow 33. To prevent, in either direction, the fluid circulation from being able to cause a displacement of the valves 14 an 28 in the same direction, and thus disturb the operation of the installation, it is indispensable that each valve, 14 and 28, be associated with a stop, limiting its opening movement to the normal value, as shown in FIG. 4. Therefore, as this figure shown, the side branches 26a of the spring in catch (hook) form 26, and forming the stop limiting the opening movement of the valve 14 of the female element 2, are, in this normal opening position of this valve 14, situated just behind the shoulder 23 of the stem 14a of the valve 14.

Now, as mentioned before, to permit the coupling of the elements 2 and 12 of this coupler, despite the possible existence of a residual pressure in the use circuit, it is indispensable that the valve 14 of the female element 2 can make a movement double its course C1, necessary to its normal opening. More precisely, this valve 14 must be able to effect a movement equal to the sum of the normal opening movements of the valves 12 and 28.

Figure 3:
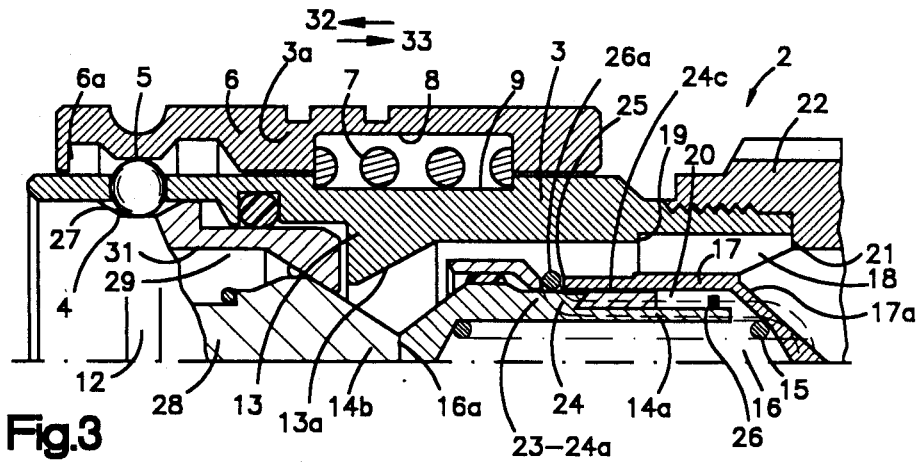
FIG. 3 is a view similar to FIG. 1 and 2, showing the coupler after coupling these two elements, in the case where there is a residual pressure in the use circuit.

Through this arrangement, the coupling can be done as shown in FIG. 3, which shows the balls 5 engaged in the throat 27 of the tip of the male element 12, without the valve 28 of this element being raised from its seat 29. This coupling is made possible by the retractable nature of the stop of the valve 14, consisting of the branches 26a of the spring in catch (hook) form 26.

The operation of the retractable stop 26 of the valve 14, in the coupling of the female 2 ad male 12 elements of this coupler is as follows:

Before the coupling, that is, while all the elements are at rest, the valve 14 of the female element 2 is in closing position and the branches 26a of the catch 26 grip between them the sliding ring 24 of its stem 14a, being supported on the cylindrical segment 24b of the ring 24, of which the rear end is itself supported on the collar 20 of the rear end of the stem 14a of the valve 14.

During the engagement of the tip of the male element 12 into the bore 3a of the female element 2, and if there remains, in the use circuit, a residual pressure which could oppose the lifting of the valve 28 of this male element 12, supported against the valve 14, the valve 28 causes its retreat in the direction of the arrow 33, into the position shown in FIG. 3. During this retreat, the radial gripping of the ring 24 by the side branches 26a of the catch 26 assures the axial retention, so that the ring 24 is held in position, despite the retreat of the stem of the valve 14 until the shoulder 23 of the latter is engaged on the truncated cone segment 24a of the ring 24, as shown in FIG. 2.

Obviously, the retreat, in the direction of the arrow 33, of the valve 14, also brings the retreat of the ring 24, in the same direction, into the position shown in FIG. 3. During this retreat, the ring 24 slides between the branches 26a of the catch 26, until the section 14'a of the stem 14 is itself engaged between the branches 26a of the catch 26, as shown in FIG. 3.

It may be seen from FIG. 2 that the truncated cone segment 24c of the ring 24, provides a solution of continuity (a transition), between this latter and the section 14'a of the stem 14a of the valve 14. The male element 12 of the coupler being then locked into this female element 2, it is then possible to open the use circuit, so as to establish the circulation of fluid in the direction of the arrow 32. Naturally, the pressure of fluid penetrating into the female element 2 of this coupler, which is, of course, greater than the residual pressure prevailing in the use circuit, will inevitably cause the lifting of the valve 28 and, consequently, the movement of the valves 14 and 28 in the direction of fluid circulation, that is, that shown by arrow 32.

The stop associated with the valve 28 will let the movement of this latter, in the direction of arrow 32, to its normal opening position, shown in FIG. 4. The valve 14 will thus stop in its progress by the stop limiting the opening movement of the valve 28. Now, during this movement of the valve 14 in the arrow direction 32, from its position shown in FIG. 3 to that shown by FIG. 4, nothing will cause the pulling of the ring 24 in the same direction, so long as the collar 20 of the rear end of the stem 14a of the valve 14 has not come in contact with the rear end of the ring 24. As a result, then, the ring 24 tends to remain in the position it occupies in FIG. 3, so that there is then created, between the shoulder 23 and the truncated cone end 24a of the ring $24_t$ an annular hollow 34 in which can engage the side branches 26a of the catch 26, immediately after the passage of the shoulder 23. The coupler is then in the use position, as shown in FIG. 4, in which the two valves 14 and 28 are in normal opening position, supported behind and against their stops, limiting opening movement. The direction of fluid circulation within the coupler may thus be reversed without difficulty and without changing the position of valves 14 and 28 in any way.

Figure 5:
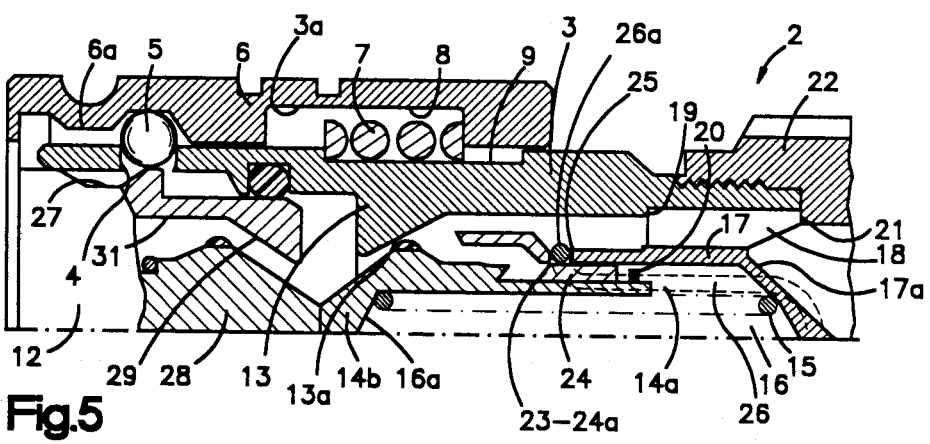
FIG. 5 is a view similar to FIG. 4, showing the coupler during the beginning of an uncoupling operation, that is, of withdrawal of the male element in relation to the female element.

To uncouple the two elements, male 12 and female 2, of this coupler, it is only necessary to move axially the outer mobile ring 6, in one or the other direction, until its groove or fin 6a is effaced, in relation to the row of locking balls 5, as shown in FIG. 5. The withdrawal of the tip of the male element 12 thus frees of any constraint the valve 14 of the female element 2, which under the action of its pull-back spring 13, is brought back into its closing position by movement in the direction of the arrow 32. During this movement of the valve 14, the truncated cone segment 24a of this ring 24 engages under the side branches 26a of the catch 26 and distances them one from the other, thus allowing the pursuit of the closing movement of the valve 14. This explains the reasons for the presence of the truncated cone segment 24a of the ring 24.

Figure 6:
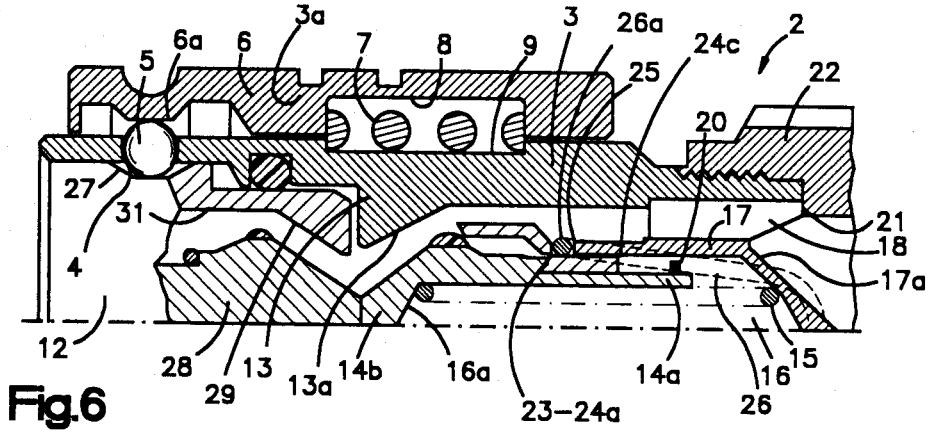
FIG. 6 is a view similar to FIG. 5, showing the two assembled elements of the coupler when the coupling has been done in the absence of residual pressure in the use circuit.

FIG. 6 shows the principle of operation of this coupler, in the case where, during the coupling of these elements, male 12 and female 2, no residual pressure exists in the use circuit. It is evident that, under these circumstances, the engagement of the tip of the male element 12 in the bore 3a of the female element 2, the two valves 28 and 14 rise mutually until they are in their normal opening position as shown in FIG. 6. Now, at the beginning of this engagement, as FIG. 1 shows, the side branches 26a of the catch 26, supported against the cylindrical segment 24b of the ring 24, tend to retain it in the position which it occupies before the coupling, and this, despite the retreat of the stem 14a of the valve 14, which, by this fact, slides without being pulled into the bore of the ring 24. However, the retention of the ring 24 by the side branches 26a of the catch 26 is assured only until the shoulder 23 is engaged against its truncated cone segment 24a. From the moment of this engagement, the ring 24 is drawing in the direction of the arrow 33, and this and this drawing is assured until the valve 14 has made its normal opening movement C1, as shown in FIGS. 4 and 6. However, in the example shown in FIG. 6, this position is obtained without the valve 14 having passed first its position corresponding to its double opening movement. A result, no hollow has been created between the shoulder 23 and the ring 24, as in the example of FIG. 4, but the side branches 26a of the catch 26 are supported against the truncated cone segment 24c of the ring 24.

The pressure exerted radially by the side branches 26a of the catch 26 on this truncated cone segment 24c results in driving the ring 24 in the arrow direction 33, that is, toward the collar 20, and, consequently, allows the creation of the hollow 34 and the fall of the side branches 26a of the catch 26 onto the section 14"a of the stem 14a of the valve 14, behind the should 23. This explains, therefore, the reasons for the presence of this truncated cone segment 24c on the ring 24.

This coupler has the advantage, therefore, of working perfectly, whatever the conditions of use under which the coupling of male and female elements takes place.

What is claimed is:

1. An improved coupler of the type having a retractable valve piece movable in a cylindrical sleeve fixed to a coupler body, said valve piece being movable in said sleeve between a closed position and an open position and a double open position; said open position corresponding to a position with a mating coupler in an open position and said double open position corresponding to a position with a mating coupling in a closed position; the improvement comprising:

said valve piece having a cylindrical section thereon which moves within said sleeve and which is bounded by a valve stop shoulder and a ring stop shoulder opposite said valve stop shoulder;

a ring which is disposed about said cylindrical section and axially movable thereon between a locking position against said ring stop shoulder and an unlocking position against said valve stop shoulder; and a locking spring extending about said sleeve and having opposed catch portions which are urged inwardly; and said sleeve having opposed openings to receive therethrough said catch portions of said locking spring such that, when said ring is in said locking position said catch portions can move inwardly to engage said valve stop shoulder and prevent movement of said valve to said double open position, and when said ring is in said unlocking position said ring prevents movement of said catch portions to engage said valve stop should and thereby allows movement of said valve to said double open position.

2. The coupler of claim 1 wherein said ring has a truncated cone end shape disposed to form a ramp type lifting of said catch portions of said spring as said valve moves from an open position with said catch portions engaging said valve stop shoulder to said closed position; and wherein said valve stop shoulder has a mating truncated cone opening to receive said truncated cone end therein.

3. The coupler of claim 2 wherein said locking spring is formed of a single piece having branch portions which extend at right angles to a body portion, said body portion being disposed against said sleeve and said branch portions forming said opposed catch portions.

* * * * *